United States Patent
Yamaji

(10) Patent No.: US 8,599,285 B2
(45) Date of Patent: Dec. 3, 2013

(54) IMAGE LAYOUT DETERMINING METHOD, RECORDING MEDIUM AND INFORMATION PROCESSING APPARATUS FOR THE SAME

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 556 days.

(21) Appl. No.: 12/890,993

(22) Filed: Sep. 27, 2010

(65) Prior Publication Data

US 2011/0074819 A1 Mar. 31, 2011

(30) Foreign Application Priority Data

Sep. 29, 2009 (JP) .................................. 2009-225042

(51) Int. Cl.
*H04N 5/262* (2006.01)
*H04N 5/225* (2006.01)
*H04N 7/00* (2011.01)
*G09G 5/10* (2006.01)

(52) U.S. Cl.
USPC ... 348/239; 345/634; 348/240.2; 348/207.11; 348/36

(58) Field of Classification Search
USPC ............. 348/36, 39, 207.11, 240.2, 284, 239; 382/225; 345/634
See application file for complete search history.

(56) References Cited

U.S. PATENT DOCUMENTS

| 6,148,150 | A | 11/2000 | Yajima et al. |
| 6,623,528 | B1 * | 9/2003 | Squilla et al. .................. 715/202 |
| 2004/0165000 | A1 | 8/2004 | Nagahashi et al. |
| 2005/0099494 | A1 * | 5/2005 | Deng et al. ....................... 348/36 |
| 2006/0279555 | A1 * | 12/2006 | Ono ............................... 345/173 |
| 2009/0022422 | A1 * | 1/2009 | Sorek et al. ..................... 382/284 |
| 2009/0051789 | A1 * | 2/2009 | Ohsawa ...................... 348/240.2 |
| 2009/0087016 | A1 * | 4/2009 | Berestov et al. .............. 382/100 |
| 2009/0214197 | A1 * | 8/2009 | Kawada ......................... 396/301 |
| 2009/0284619 | A1 * | 11/2009 | Akao et al. ................. 348/231.3 |
| 2010/0013906 | A1 * | 1/2010 | Border et al. .................... 348/36 |
| 2010/0097442 | A1 * | 4/2010 | Lablans .......................... 348/36 |
| 2011/0122253 | A1 * | 5/2011 | Kino et al. ..................... 348/169 |

FOREIGN PATENT DOCUMENTS

| JP | 2000-039641 | 2/2000 |
| JP | 2004-128683 | 4/2004 |
| JP | 2004-199248 | 7/2004 |

(Continued)

OTHER PUBLICATIONS

JP Office Action dated Jun. 24, 2013, with partial English translation; Application No. 2009-225042.

*Primary Examiner* — Nhan T Tran
*Assistant Examiner* — Xi Wang
(74) *Attorney, Agent, or Firm* — Young & Thompson

(57) ABSTRACT

If subject types of a still image material and a panoramic image are different, for example if the subject type of the still image material is animal and the subject type of the panoramic image is landscape, a layout determination unit determines a representative position in the point image as a position for placing the still image material. If a point image is of the same subject type, the layout determination unit determines, as the position for placing the still image material, a position outside the area of the panoramic image near the representative position in the point image. Thus, if there are a plurality of still image materials shot with different zoom factors and corresponding to the same point image, the layout determination unit can determine the layout of the still image materials according to the zoom factor for each still image material.

10 Claims, 8 Drawing Sheets

(56) References Cited

FOREIGN PATENT DOCUMENTS

| | | |
|---|---|---|
| JP | 2005-252739 | 9/2005 |
| JP | 2006-033353 | 2/2006 |
| JP | 2007-267008 | 10/2007 |
| JP | 2008-244997 | 10/2008 |
| JP | 2008-289095 | 11/2008 |
| JP | 2009-204888 | 9/2009 |

* cited by examiner

FIG.7
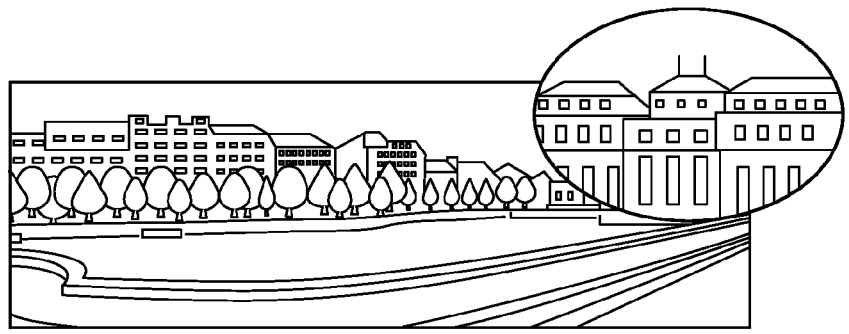
FIG.8
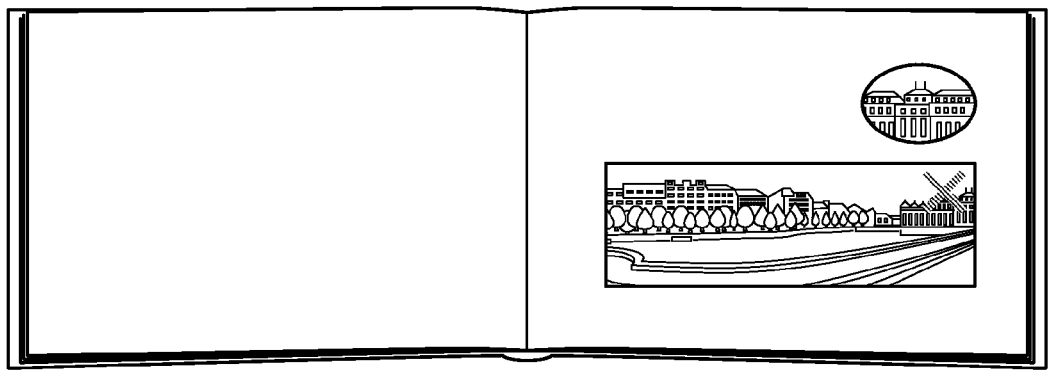
FIG.9
| No | CAMERA MOVEMENT | | PROCESSING |
|---|---|---|---|
| | PAN | ZOOM | |
| 1 | FROM LEFT TO RIGHT | NONE | GENERATE PANORAMA |
| 2 | NONE | PRESENT: ZOOM UP | GENERATE STILL IMAGE |
| 3 | NONE | NONE | |
| 4 | NONE | PRESENT: ZOOM UP | GENERATE STILL IMAGE |
| 5 | NONE | NONE | |

FIG.10
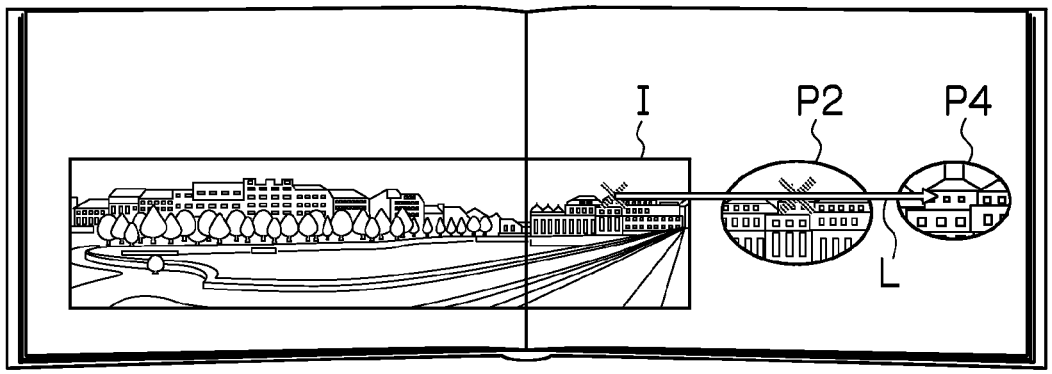
FIG.11
| No | CAMERA MOVEMENT | | PROCESSING |
| | PAN | ZOOM | |
|---|---|---|---|
| 1 | FROM LEFT TO RIGHT | NONE | GENERATE PANORAMA |
| 2 | NONE | PRESENT: ZOOM UP | |
| 3 | FROM LEFT TO RIGHT | NONE | GENERATE PANORAMA |
FIG.12
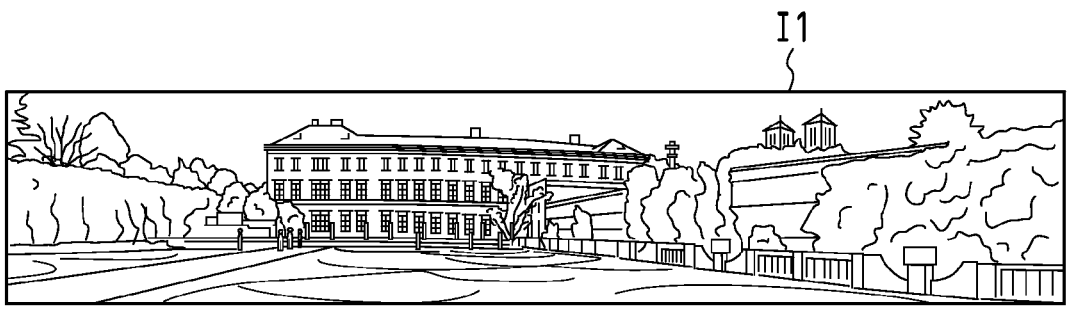

RELATED ART

IMAGE LAYOUT DETERMINING METHOD, RECORDING MEDIUM AND INFORMATION PROCESSING APPARATUS FOR THE SAME

BACKGROUND OF THE INVENTION

1. Field of the Invention

The presently disclosed subject matter relates to creating a layout for a photo book using composite images and still images.

2. Description of the Related Art

According to an invention in Japanese Patent Application Laid-Open No. 2004-128683, movement information at the time of shooting with a digital camera is measured by various sensors such as a three-dimensional gyroscope, zooming movable device operation information, and a three-dimensional acceleration measurement unit. The movement information is attached to image data corresponding to each frame and recorded in a memory card or internal memory. A splitting device extracts the movement information from the recorded image data having the movement information attached thereto. Based on the extracted movement information, a computation device computes a moving direction and a moving distance of the digital camera at the time of shooting. An image processing device extracts adjacent subject frames to generate a composite image.

An image layout apparatus of an invention in Japanese Patent Application Laid-Open No. 2004-199248 is provided with a region of interest calculation device that calculates a region of interest in an image A over which another image B is to be superimposed, and a layout device that determines a layout such that the region of interest in the image A is not hidden by the image B.

Japanese Patent Application Laid-Open Nos. 2005-252739 and 2007-267008 are examples of conventional techniques of generating a composite image from still images and a moving image, respectively.

Japanese Patent Application Laid-Open No. 2008-289095 describes an example of detecting the moving speed and direction (a motion vector) of a camera based on image data.

Japanese Patent Application Laid-Open No. 2000-039641 describes an example of a mechanism of detecting the moving speed in panning (horizontal)/tilting (vertical) directions of a camera with a pan head.

Japanese Patent Application Laid-Open No. 2009-204888 describes an example of a camera with variable zoom speed.

Japanese Patent Application Laid-Open No. 2008-244997 describes an example of a method of detecting whether a shot subject is a person or a landscape.

SUMMARY OF THE INVENTION

A generally known method of generating a composite image is such that a plurality of material images (still images or moving image frames) containing an at least partially overlapping subject are joined together or overlaid so that the overlaps of the subject are matched with each other.

Typically, what is suitable for such composite image generation is a moving image shot by moving a camera in one direction to have an uninterrupted subject. If a composite image is generated from a moving image in which a particular position is zoomed up without moving a camera, only the zoomed portion of the subject is inconsistent with other portions of the subject, resulting in a break in the continuity of the subject in the composite image (see FIG. 17).

An object of the presently disclosed subject matter is to generate an appropriate composite image by utilizing shooting conditions such as the zoom factor of a camera associated with the shooting time of each material image. Another object of the presently disclosed subject matter is to determine a visually appealing layout of a set of a composite image and a still image.

The presently disclosed subject matter provides a method of determining an image layout performed by an information processing apparatus, comprising: inputting material image candidates that are images including moving image frames and/or still images shot by an imaging device; detecting an shooting condition of the imaging device at analysis times, the analysis times being shooting times of all or part of the material image candidates or times around the shooting times; based on the shooting condition of the imaging device detected for respective analysis times, determining, among the material image candidates, composite image materials serving as materials for generating each composite image, and a still image material serving as a material for a still image associated with the composite image; generating the composite image based on the composite image materials; and determining an arrangement of the still image material and the composite image based on the shooting condition at the analysis time corresponding to the still image material.

The method of determining an image layout may further comprises if a difference in the detected shooting condition of the imaging device between material image candidates at temporally adjacent analysis times is above a predetermined threshold, determining, as the still image material, a material image candidate corresponding to the analysis time at which the difference is above the predetermined threshold.

The method of determining an image layout may further comprises: detecting a movement of the imaging device at each analysis time; and determining, as the still image material, a material image candidate corresponding to an analysis time at which the movement of the imaging device is below a predetermined threshold.

The method of determining an image layout may further comprises: detecting a zoom factor of the imaging device at the time of shooting each material image candidate; and determining, as the still image material, a material image candidate at the time when the zoom factor is above a predetermined threshold.

The method of determining an image layout may further comprises: determining whether or not a type of a subject in the still image material and a type of a subject in the composite image are the same; and in response to determining that the types of the subjects in the still image material and the composite image are the same, determining an area outside the composite image as a position for placing the still image material.

The method of determining an image layout may further comprises: specifying a point material that is a composite image material shot with a camera position matching a camera position at the time of shooting the still image material; and determining, as a position for placing the still image material, an area in the composite image around where the point material exists.

The method of determining an image layout may further comprises: detecting a zoom factor at the time of shooting each of a plurality of still image materials; and determining predetermined positions as positions for placing the plurality of still image materials, the predetermined positions being such that a representative position in the point material of the composite image and a representative position in each of the plurality of still image materials correspond to the zoom factor at the time of shooting each of the plurality of still image materials.

The method of determining an image layout may further comprises: detecting a zoom speed of the imaging device at each analysis time; and based on the zoom speed detected for each analysis time, excluding, from still image materials, a material image shot at the time when the zoom speed is above a predetermined threshold among the material image candidates.

The method of determining an image layout may further comprises: determining a size of each composite image based on a zoom factor for each composite image.

The presently disclosed subject matter provides a non-transitory recording medium on which a program is recorded, the program comprising instructions for an information processing apparatus to perform the method. On the recording medium, the program may be non-transitorily recorded. In addition, the presently disclosed subject matter provides an information processing apparatus that performs the method.

The presently disclosed subject matter enables determining materials for an appropriate composite image by using shooting conditions such as the zoom factor of a camera associated with the shooting time of each material image. The presently disclosed subject matter also enables determining a visually appealing layout of a set of a composite image and a still image.

BRIEF DESCRIPTION OF THE DRAWINGS

FIG. 7 is a diagram showing an example of layout of a still image material containing a landscape subject with respect to a panoramic image containing a landscape subject;

FIG. 8 is a diagram illustrating a still image material placed near a representative position of a point image outside an area where a panoramic image exists;

FIG. 9 is a diagram illustrating moving directions and zoom factors of a camera;

FIG. 10 is a diagram illustrating a spatial relationship among a panoramic image and still image materials with different zoom factors;

FIG. 11 is a diagram showing an example of occurrence or nonoccurrence of a camera movement and a zoom operation at the time of shooting of each material image candidate, and corresponding processing;

FIG. 12 is a diagram showing an example of a panoramic image;

DETAILED DESCRIPTION OF THE PREFERRED EMBODIMENTS

Figure 1:
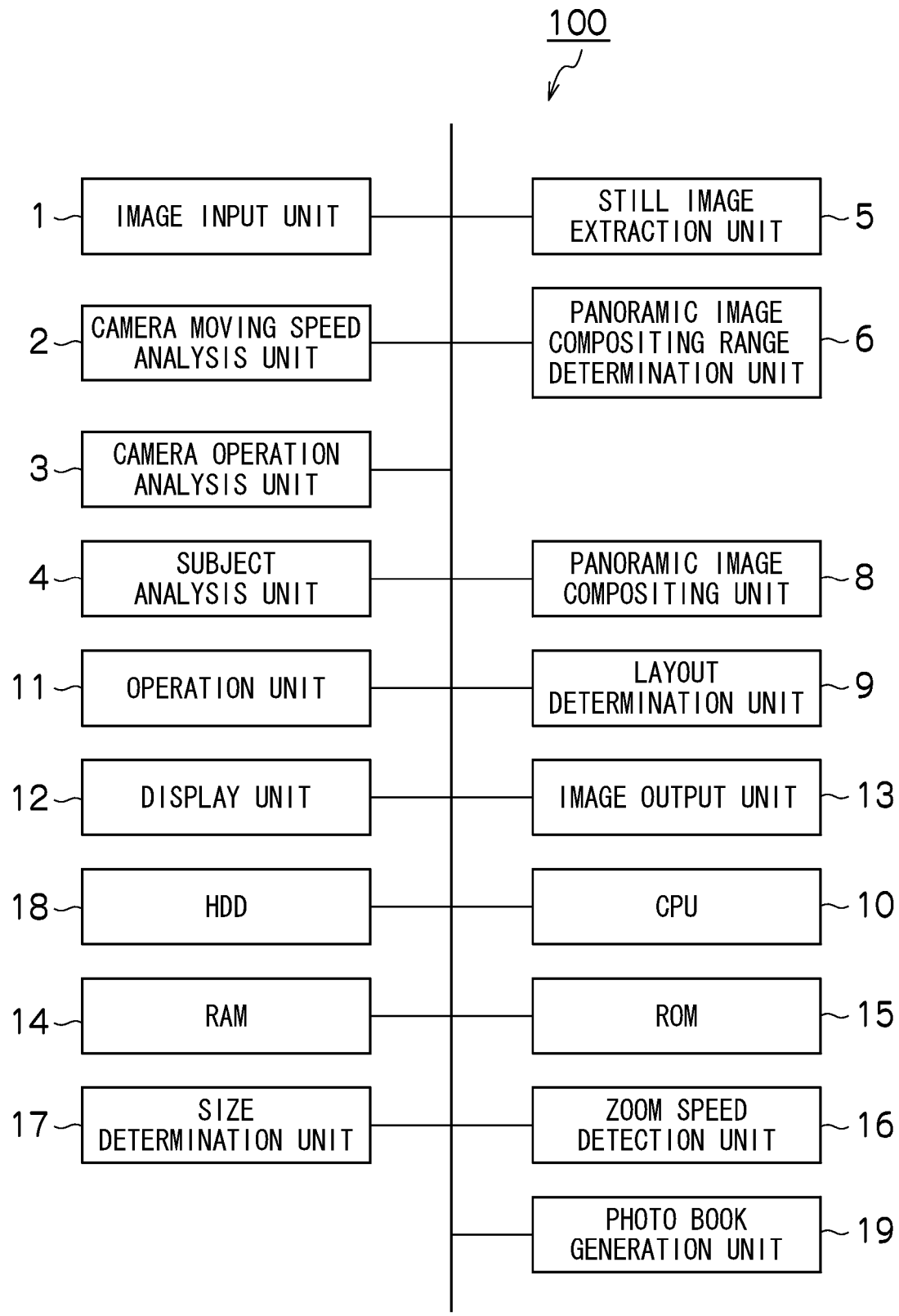
FIG. 1 is a block diagram showing a schematic configuration of a panoramic image generation apparatus.

FIG. 1 is a block diagram showing a schematic configuration of a panoramic image generation apparatus 100 to which the presently disclosed subject matter is applied. The panoramic image generation apparatus 100 reads images (a plurality of pieces of still image data, or a plurality of moving image frames that are still images captured from a moving image, or even a mixture of the both) serving as materials for a panoramic image, for example from a storage medium such as any of various recording media including a CD (Compact Dick) and DVD (Digital Versatile Disk), or a memory card, or from a general purpose interface for connecting peripheral devices, such as a USB (Universal Serial Bus) interface, connected with a camera, or from a network such as the Internet or a LAN (Local Area Network), via an image input unit 1. The panoramic image generation apparatus 100 uses the read images as materials to generate a panoramic image (an image generated by joining together or overlaying a plurality of images containing an at least partially overlapping subject so that overlapping areas of the subject are matched (superimposed) with each other). As an example, the moving image data is compatible with a compressive recording standard such as Motion JPEG (Joint Photographic Experts Group) format or MPEG-4 (Moving Picture Experts Group) format. As an example, the still image data is compatible with an image file format such as JPEG, TIFF (Tag Image File Format), or EXIF (Exchangeable Image Format) standardized for digital still cameras.

A camera as used herein includes components such as the following: an optical unit having a focus lens, a zoom lens, an aperture and the like; an imaging element such as a CCD (Charge Coupled Device) or CMOS (Complementary Metal-Oxide Semiconductor) performing photoelectric conversion of an image of a subject formed through the optical unit into an image signal; an AD (Analog-Digital) converter converting the image signal from the imaging element into digital image data; an image processing circuit performing image quality correction processing such as gamma correction, sharpness correction, contrast correction, and color correction for the image data from the AD converter; and an image recording circuit converting the image data processed by the image processing circuit into a predetermined saving format (such as MPEG) and recording the image data in a recording medium such as a memory card. The camera consists of a known digital still camera or digital video camera capable of taking still images and/or moving images. The camera also records shooting conditions on the materials at the time of shooting (such as the compression rate of moving image frames or still images, the zoom factor, the zoom speed, the aperture, the focal length, GPS (Global Positioning System) position information, the frame rate of the moving image, and shooting dates and times) as supplementary information about the moving image.

Material image candidates are a series of still images such as continuously shot images or moving image frames which contain overlapping areas from which a panoramic image can be generated. For simplicity of illustration, the following description assumes that the material image candidates are moving image frames. However, the material image candidates may be still images or even a mixture of moving image frames and still images.

The system configuration in FIG. 1 is merely an example, and the presently disclosed subject matter can be implemented in any information processing apparatuses (for example, a personal computer, a printing terminal at a shop, a PDA (Personal Digital Assistance), and a mobile phone) having a configuration equivalent to the illustrated configuration. Also, blocks shown do not necessarily need to be integrated into one electronic device. Rather, the presently disclosed subject matter can be implemented if each of the blocks forms part of a different electronic device and if information transmission and reception among the electronic devices are secured by some communications such as a network. Thus, the implementation of the presently disclosed subject matter does not depend on any particular device configurations.

The panoramic image generation apparatus 100 is operated with an operation unit 11 that includes various operation devices such as the following: a pointing device capable of indicating the movement of a pointer (cursor), such as a mouse, touch pad, or trackball; and a touch panel. The touch panel is layered over a display unit 12 that includes a liquid crystal display. Pressing button display portions on the display unit 12 allows entering characters corresponding to those portions or starting various functions.

An image output unit 13 is connected to the panoramic image generation apparatus 100. The image output unit 13 prints specified still images, as a panoramic image generated by a panoramic image compositing unit 8, on a sheet that consists of a paper medium such as plain paper or printing paper. Alternatively, still images arranged in a predetermined layout can be output, as an electronic medium like "PDF" of Adobe Systems Incorporated, to destinations such as the display unit 12, a recording medium, and a personal computer connected over the Internet.

An HDD (Hard Disk Drive) 18 stores one or more pieces of still image data, moving image frames, and panoramic images, serving as main materials for image prints. In addition, the HDD 18 stores decorative image data (graphics) and the like to be combined with these main materials in generating the image prints. It should be understood that the HDD is an example of storage medium and any other medium which can store image data and so on can be used instead of the HDD. The graphics include the following: still images; character data that consists of characters (kanji (Chinese character), katakana, hiragana, alphabets, symbols, pictograms, and other meaningful readable symbols, and combinations thereof, etc.) to be inserted into images; graphic data such as text boxes, balloons, signboards, and bulletin boards for including these characters therein, and other objects suitable for placing characters therein; masking images for covering unnecessary portions of images to be processed; illustration; and clip art. Such decorative images add color to a photo book by decorating composite images and still images forming main materials for the photo book or by adding a piece of decoration. A photo book is data for causing a display or a printer to output panoramic images and still image materials with a page-by-page layout and design, or is a printing medium, such as paper, on which the images are printed with a page-by-page layout and design.

The panoramic image compositing unit 8 generates a panoramic image from material images determined by a panoramic image compositing range determination unit 6 among material image candidates input from the image input unit 1. The detailed way of generating a panoramic image can follow a conventional technique. That is, the panoramic image compositing unit 8 generates a panoramic image by joining a plurality of material images together so that overlapping areas are matched (superimposed) with each other. Moving image frames or still images serving as materials for the panoramic image are a series of images containing overlapping areas of a subject from which a panoramic image can be generated, such as continuously shot images. An arbitrary shooting method of images may employed.

A CPU (Central Processing Unit) 10 executes programs stored in the HDD 18 or a ROM (Read Only Memory) 15 to control the entire panoramic image generation apparatus 100.

A camera moving speed analysis unit 2, a camera operation analysis unit 3, a subject analysis unit 4, a still image extraction unit 5, the panoramic image compositing range determination unit 6, the panoramic image compositing unit 8, and a layout determination unit 9 are coprocessors execute respective special processing and assist the processing operation of the CPU 10. A RAM (Random Access Memory) 14 stores data necessary for the processing by the CPU 10 and the coprocessors.

The camera moving speed analysis unit 2 analyzes, from a series of material images input from the image input unit 1, a moving speed and a moving direction of the camera at the time of shooting of each material image.

Two ways of analyzing the speed and direction are possible: analyzing based on image analysis of the material image candidates, and analyzing based on camera movement information (a motion vector) obtained from a sensor in the camera.

In the case of calculating the speed based on image analysis, the camera moving speed analysis unit 2 plots a trail (trajectory) of a representative position (for example, a feature point or a center point of the subject) of each material image candidate on an X-Y coordinate plane. Then, the moving speed and direction of the camera at the time of shooting of each material image candidate are calculated from the displacement, i.e., the distance, between representative positions of the material image candidates and from the shooting interval between the material image candidates. The moving direction of the camera is the direction in which the trail is plotted along a time-line. The shooting interval is the frame rate if the material image candidates originate from a moving image, whereas the shooting interval is the difference in information about shooting dates and times of two different material image candidates if the material image candidates originate from still images.

The camera movement information obtained from the sensor in the camera is information about the angular velocity or acceleration and its direction of a panning/tilting operation of the camera at the time of shooting of each material image candidate, detected by a movement detection sensor (such as an angular velocity sensor or an acceleration sensor) provided in the camera. This information can be obtained along with each material image candidate from the image input unit 1 as supplementary information (header information, tag information, or meta-information) about the material image candidate. The angular velocity or acceleration in the particular direction is created by an intended action of a cameraperson.

The camera moving speed analysis unit 2 calculates the moving speed of the camera according to the camera movement information. It is noted that, instead of the sensor provided in the camera itself, a sensor provided on a camera attachment (such as a pan head or a GPS receiver) may detect the moving speed and the moving direction of the camera, and the camera moving speed analysis unit 2 may simply recognize this information as the camera movement information.

The camera operation analysis unit 3 detects the moving direction of the camera at the time of shooting of each material image candidate. As in the analysis of the speed, two ways of detecting this moving direction are possible: detecting based on image analysis, and detecting based on the camera movement information obtained from the sensor in the camera. Therefore, the camera moving speed analysis unit 2 and the camera operation analysis unit 3 may be integrated together. The camera operation analysis unit 3 also detects the zoom factor at the time of shooting of each material image candidate. The zoom factor can be detected in such a manner that a zoom factor that is input and designated through a zoom instruction operation device such as a zoom button is written as supplementary information about each material image candidate to an image file, and the supplementary information is read out.

The subject analysis unit 4 performs image analysis of each material image candidate to specify the type of a subject in the material image candidate. For example, the subject analysis unit 4 determines whether the subject contained in the material image candidate is a person, an animal, or a landscape. Any specific way of specifying the subject may be used, and it may be based on a known technique (for example, Japanese Patent Application Laid-Open No. 2008-244997). If focal length information about the camera is available from supplementary information such as a tag, the subject analysis unit 4 calculates the distance from the camera to the subject based on the focal length information. As in Japanese Patent Application Laid-Open No. 2008-244997, the subject analysis unit 4 may compare this subject distance with a threshold to detect that the subject is a landscape.

The camera moving speed analysis unit 2 can calculate the camera speed with respect to the subject based on the angular velocity provided from the angular velocity sensor and the distance to the subject calculated by the subject analysis unit 4.

Alternatively, the camera moving speed analysis unit 2 can calculate the moving speed of the camera by using techniques disclosed in Japanese Patent Application Laid-Open Nos. 2008-289095 and 2000-039641. In short, the camera moving speed analysis unit 2 can employ any specific way of calculating the camera speed.

A zoom speed detection unit 16 detects the zoom speed at the time of shooting of each material image candidate based on supplementary information about the zoom speed according to a zoom operation at the time of shooting of the material image candidate (the moving speed of the zoom lens in an optical axis direction according to a zoom operation input to the camera).

The panoramic image compositing range determination unit 6 detects the zoom factor of the camera at the time of shooting of each material image candidate from the supplementary information and calculates the difference in zoom factor between material image candidates (adjacent material image candidates) whose shooting times are adjacent. Material image candidates shot when the difference in zoom factor from the adjacent material image candidate was above a predetermined threshold are excluded from the material images, and other material image candidates are determined as the material images. Alternatively, the panoramic image compositing range determination unit 6 may compare the absolute value of the zoom factor at each shooting time with a predetermined threshold and exclude, from the material images, material image candidates shot at shooting times at which a zoom factor above the predetermined threshold was specified.

The panoramic image compositing range determination unit 6 may detect the zoom factor as well as other shooting conditions such as the focal length, the exposure value, and the white balance of the camera at the time of shooting of each material image candidate from the supplementary information, and calculate the differences in shooting conditions between material image candidates at adjacent shooting times. Material image candidates shot when the differences were more than predetermined thresholds can be excluded from the material images, and other material image candidates may be determined as the material images. This is to avoid a break in the continuity of the subject in the panoramic image, which would occur if material image candidates with their zoom factor, exposure, subject distance, etc. significantly different from other material image candidates are used as the material images together with the other material image candidates to composite a panoramic image.

Figure 2:
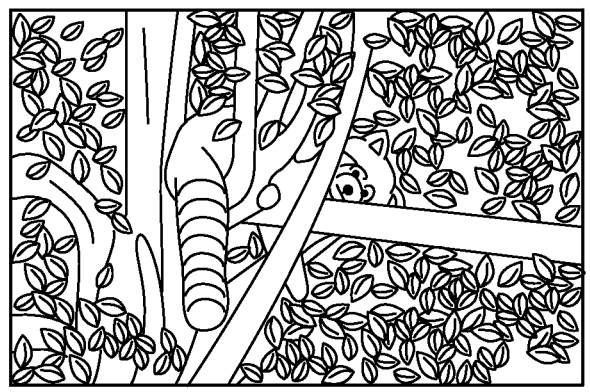
FIG. 2 is a diagram showing an example of a still image material.

The panoramic image compositing range determination unit 6 associates each material image candidate excluded from the material images with the zoom factor at the time of shooting of the material image candidate and the subject type of the material image candidate, and stores these items as still image material information in the HDD 18. Hereinafter, images included in the still image material information are called still image materials. FIG. 2 shows an example of a still image material.

The panoramic image compositing range determination unit 6 may simply determine, as the still image materials, material image candidates shot when the zoom factor was changed. However, frames shot when the zoom factor was changed while the camera was being moved are not suitable to be used as still images. Therefore, the panoramic image compositing range determination unit 6 desirably determines, as the still image materials, material image candidates shot when the zoom factor was changed while the camera was held still.

If a predetermined number of material image candidates are excluded from the material images, for example if all material image candidates are excluded from the material images, the panoramic image compositing range determination unit 6 provides an alert message like "This moving image is not suitable for compositing panoramic images. Do you want to continue the processing?" through text display on the display unit 12 or voice from a speaker. The panoramic image compositing unit 8 may composite panoramic images from the material images only if an indication to continue the processing is input through the operation unit 11.

Various thresholds referred to by the panoramic image compositing range determination unit 6 may be stored in a non-rewritable manner in a nonvolatile storage medium such as the ROM 15, or they may be values arbitrarily set through the operation unit 11.

Typically, a predetermined threshold is zero. In this case, the panoramic image compositing range determination unit 6 excludes, from the material images, material image candidates shot when the zoom factor was changed among the material image candidates and determines the other material image candidates as the material images.

Figure 3:
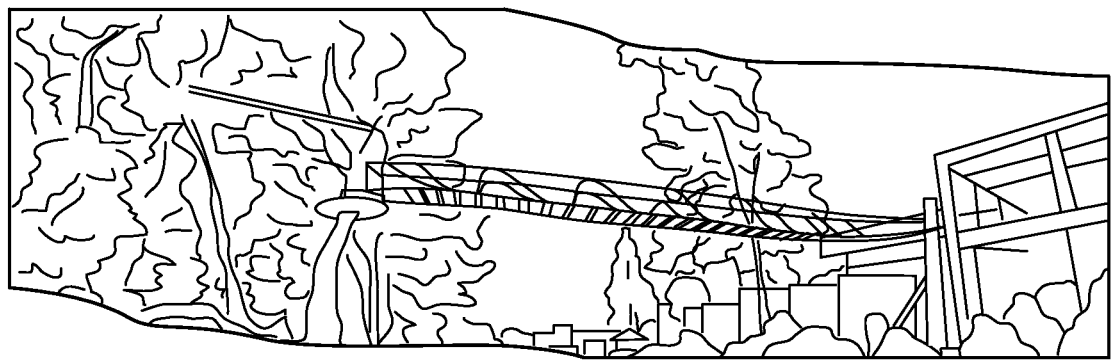
FIG. 3 is a diagram showing an example of a panoramic image.

The panoramic image compositing unit 8 composites each panoramic image based on the material images determined by the panoramic image compositing range determination unit 6. FIG. 3 shows an example of a panoramic image composited by the panoramic image compositing unit 8.

The layout determination unit 9 determines the layout on the photo book of the still image materials and the panoramic images according to the types of the subjects contained in the still image materials and the types of the subjects contained in the material images.

For example, the layout determination unit 9 determines the layout on the photo book of each panoramic image according to predetermined rules (for example, determines a layout in which each page has one panoramic image placed thereon). The layout determination unit 9 then specifies a subject in the panoramic image existing at the same spatial position as the subject in a still image material, and determines a position around the specified subject as the position for placing the still image material.

The layout determination unit 9 specifies that the subjects in both of the still image material and the panoramic image are at the same position in the following manner, for example. The layout determination unit 9 detects a motion vector composed of the shooting moving speed (moving speed at the time of shooting) and the shooting moving speed direction (for example, panning from left to right) based on the supplementary information about each material image. The layout determination unit 9 then calculates the amount of movement (such as the angle) of the camera, from the shooting time of a starting point image, which is a material image shot at the starting point of the motion vector, to the shooting time of each transitional image, which is each material image other than the starting point image. This can be calculated by comparing camera tilt information at the time of shooting of the starting point image and the tilt information at the time of shooting of each transitional image.

The layout determination unit 9 also calculates the amount of movement (such as the angle) of the camera from the shooting time of the starting point image to the shooting time of the still image material. This can be calculated by comparing the camera tilt information at the time of shooting of the starting point image and the tilt information at the time of shooting of the still image material. The layout determination unit 9 then specifies a transitional image for which the same amount of movement was calculated as the amount of movement of the camera from the starting point image to the still image material. The specified transitional image is a point image, and the layout determination unit 9 determines a representative position in the point image (such as the center coordinates of the image or a point at any of four corners of the image) as the position for placing the still image material.

Figure 4:
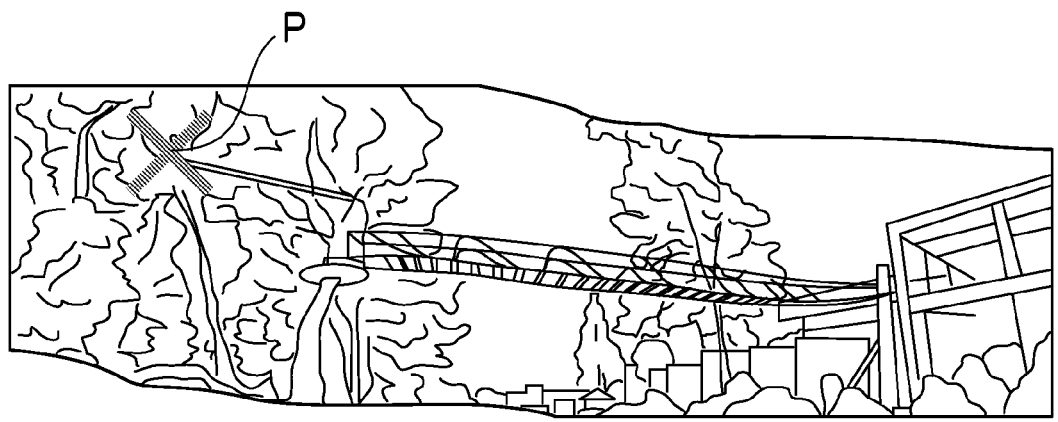
FIG. 4 is a diagram showing an example of a representative position of a point image.
Figure 5:
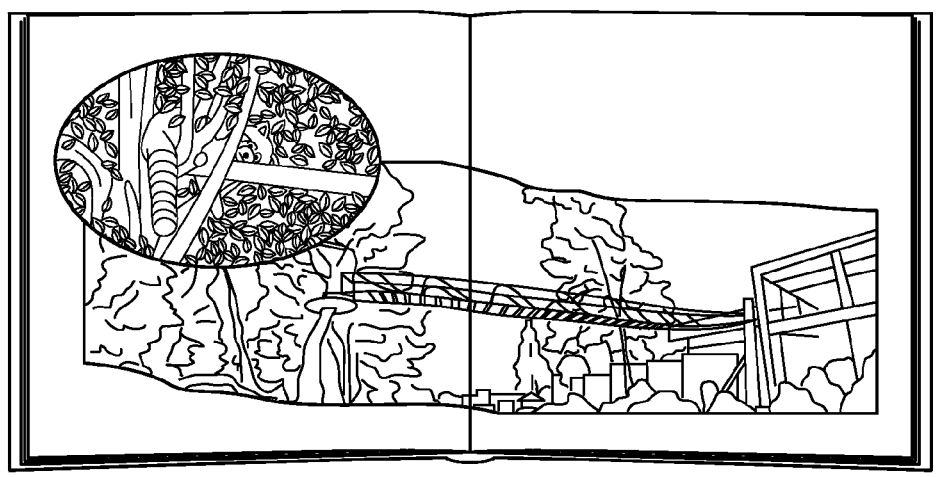
FIG. 5 is a diagram showing an example of a position for placing a still image material.

FIG. 4 is an example of a representative position P of the point image, and FIG. 5 is an example of the position for placing the still image material around the representative position P in the point image.

The layout determination unit 9 may also specify, as the point image, a material image shot when the moving speed at the shooting time is a predetermined value, typically zero. The layout determination unit 9 may also specify, as the point image, a transitional image (image in motion) shot when the moving speed at the shooting time is a predetermined value, typically zero, and when the difference between the zoom factor at the shooting time and the zoom factor for an adjacent material image is above a predetermined threshold. The layout determination unit 9 may also specify, as the point image, a transitional image shot when the moving speed at the shooting time is a predetermined value, typically zero, and when the zoom factor at the shooting time is above a predetermined zoom factor in absolute value.

However, if the subject type of the point image is landscape and the subject type of the still image material is also landscape, the layout determination unit 9 does not determine the representative position in the point image as the position for placing the still image material.

Figure 6:
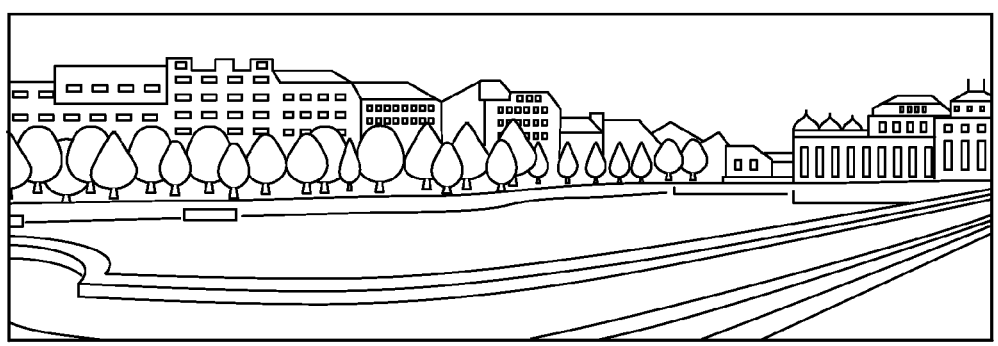
FIG. 6 is a diagram showing an example of a panoramic image containing a landscape subject.

The reason for this is as follows. In the case of a set of a still image material containing an animal subject as in FIG. 2 and a panoramic image containing a landscape subject as in FIG. 3, the cameraperson is likely to have shot the images by focusing the attention on the animal subject rather than on the landscape surrounding the animal subject. Therefore, as in FIG. 5, placing the still image material containing an animal subject on the panoramic image containing a surrounding landscape subject does not give a viewer a feeling of strangeness. However, in the case of a set of a still image material containing a landscape subject and a panoramic image containing the landscape subject as in FIG. 6, the cameraperson took the images by focusing the attention on the landscape subject. Therefore, when the still image material containing the landscape subject is placed on the panoramic image containing the landscape subject, the landscape subject on which the cameraperson focused the attention and the landscape subject on which the cameraperson did not co-exist as in FIG. 7, giving the viewer a feeling of strangeness.

Therefore, if the subject type of the point image is landscape and the subject type of the still image material is also landscape, the layout determination unit 9 determines, as a position for placing the still image material, a position near the representative position of the point image outside the area where the panoramic image exists. FIG. 8 shows an example of this. Similarly, if the subject type of the point image and the subject type of the still image material are the same, for example if the subject types are both person or both animal, the layout determination unit 9 determines, as the position for placing the still image material, a position near the representative position of the point image outside the area where the panoramic image exists. In this manner, a positional overlap and conflict between subjects of interest on the photo book can be avoided.

If there are a plurality of still image materials shot with different zoom factors corresponding to an identical point image, the layout determination unit 9 determines the layout of the still image materials according to the zoom factor for each still image material.

For example, it is assumed that the moving direction of the camera and a zoom up operation for each material image candidate are detected from the supplementary information and the like as in FIG. 9. A material image candidate No. 1 has a movement in the panning direction and no zoom change operation, and is therefore determined as a material image. Material image candidates Nos. 2 and 4 have a zoom up operation at the shooting time, and are therefore determined as still image materials. It is assumed that the zoom factor for the still image material No. 2 is smaller than the zoom factor for the still image material No. 4. The layout determination unit 9 determines the layout in which the still image materials Nos. 2 and 4 are placed near the representative coordinates of the point image of the panoramic image according to the zoom factors for the still image materials Nos. 2 and 4.

The layout determination unit 9 determines the layout so that the representative coordinates of the point image, the representative coordinates of the still image material No. 2, and the representative coordinates of the still image material No. 4 have a predetermined spatial position relationship according to the zoom factors of the still image materials.

For example, as shown in FIG. 10, the representative coordinates of the point image, the representative coordinates of the still image material No. 2 (P2), and the representative coordinates of the still image material No. 4 (P4) exist with equally spaced each other on the same line L, and the still image material P2 having the smaller zoom factor is placed closer to the panoramic image I than the still image material P4 having the larger zoom factor. Although not shown, any predetermined spatial position relationship between the still image materials according to their zoom factors may be employed. The representative coordinates may exist with equally spaced with each other on a predetermined curve. Also, the still image material P4 having the larger zoom factor may be placed closer to the panoramic image I than the still image material P2 having the smaller zoom factor. In short, the layout determination unit 9 determines the spatial arrangement order on the photo book according to the zoom factor for each still image material.

The layout determination unit 9 does not necessarily need to determine a layout such that the still image material is superimposed on (overlaps) the point image even if their subject types are different. Whether or not to employ an overlapping layout may be selectable through the operation unit 11.

A size determination unit 17 determines the size of each panoramic image according to the zoom factor at the time of shooting of the panoramic image. The size determination unit 17 may assign a larger size to a panoramic image with a larger zoom factor, or reversely, to a panoramic image with a smaller zoom factor.

Figure 13:
FIG. 13 is a diagram showing another example of a panoramic image.

The panoramic image compositing unit 8 composes the material images together so that the subject continues. However, there may be a case where a material image candidate shot with a predetermined value of moving speed or with a zoom factor change is excluded from the material images, and the excluded material image candidate is also not determined as a still image material. This may result in a break in the continuity of the subject, and a plurality of panoramic image may be composited from the material images other than the excluded material image candidate. For example, as in FIG. 11, a material image candidate No. 2 has a speed of zero at the shooting time and differs in zoom factor from other material image candidates. Then, it is assumed that the panoramic image compositing unit 8 composites a panoramic image I1 as in FIG. 12 from material images shot before the material image candidate No. 2, and a panoramic image I2 as in FIG. 13 from material images shot after the material image candidate No. 2.

Figure 14:
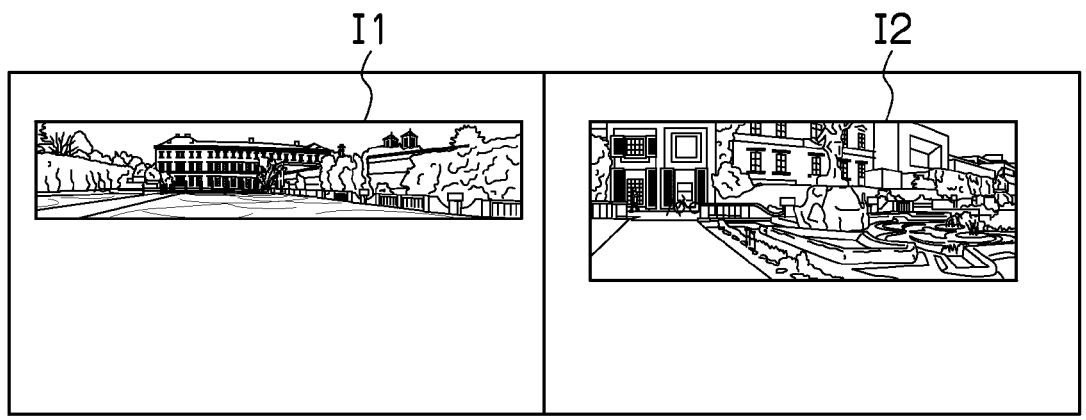
FIG. 14 is a diagram showing an example of sizes of different panoramic images.
Figure 15:
FIG. 15 is a diagram showing an example of a panoramic image generated from different panoramic images.

The size determination unit 17 determines, as the size of a panoramic image, a size proportional to the zoom factor for material images of the panoramic image. For example, if the zoom factor for the material images of the panoramic image I1 in FIG. 12 and the zoom factor for the material images of the panoramic image I2 in FIG. 13 have a ratio of 1:2, the ratio of the size of the panoramic image I1 and the size of the panoramic image I2 is set to 1:2. The layout determination unit 9 scales up or down each panoramic image according to the size determined by the size determination unit 17 and places the panoramic image in the photo book. FIG. 14 is an example of this case. The panoramic images may be placed on separate pages as in FIG. 14, or may be placed on the same page as one panoramic image as in FIG. 15. As described above, still image materials can be placed for these panoramic images.

A photo book generation unit 19 generates the photo book according to the layout of the panoramic images and still image materials determined by the layout determination unit 9 and the sizes of the panoramic images determined by the size determination unit 17.

Figure 16:
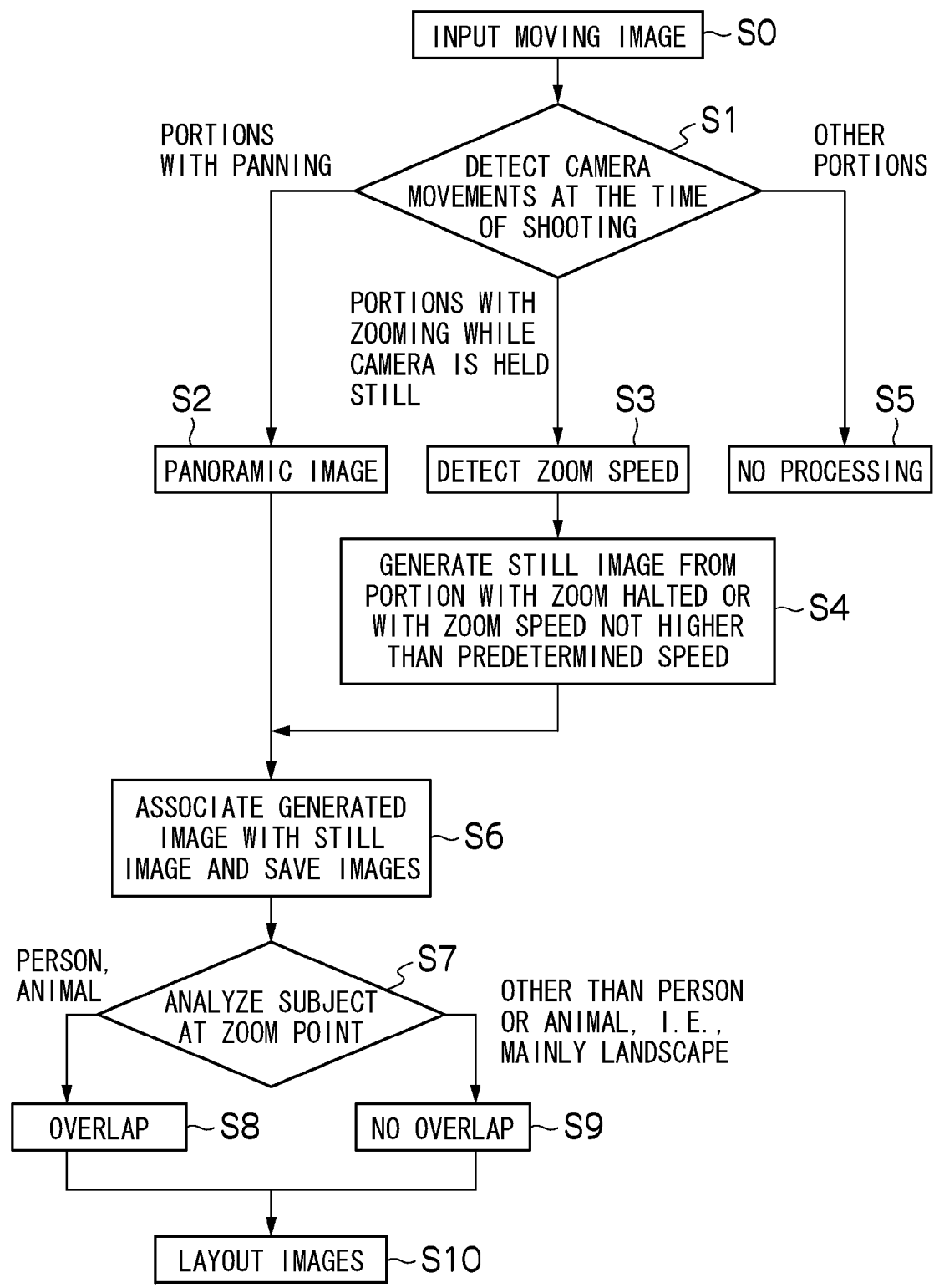
FIG. 16 is a flowchart of photo book generation processing.
Figure 17:
FIG. 17 is a diagram showing an example of a discontinuous panoramic image.

FIG. 16 shows a flowchart of the photo book generation processing performed by the panoramic image generation apparatus 100. This processing is controlled by the CPU 10. A program for causing the CPU 10 to perform this processing is stored in the HDD 18 or other computer-readable storage media. This processing is initiated when an instruction to generate panoramic images is input through the operation unit 11.

In S0, the CPU 10 inputs a moving image from the image input unit 1.

In S1, the CPU 10 controls the still image extraction unit 5 to extract frame images from the moving image input from the image input unit 1. In response to this control, frame images are extracted by the still image extraction unit 5 and stored as material image candidates in the HDD 18. The CPU 10 controls the camera moving speed analysis unit 2, the camera operation analysis unit 3, the subject analysis unit 4, and the zoom speed detection unit 16 to analyze the camera speed, the camera moving direction, the zoom factor, the zoom speed, the subject type, and the subject distance at analysis times. The analysis times are shooting times of all or part of the material image candidates stored in the HDD 18, or times around these shooting times (times closest to the shooting times among predetermined times that segment an shooting period, for example times closest to the shooting times among times obtained by segmenting a period from the start to the end of the shooting at predetermined regular intervals). The analysis times for analyzing the camera movement by the camera moving speed analysis unit 2, the camera operation analysis unit 3, and the subject analysis unit 4 may be the same as the shooting times of the material image candidates. However, the analysis times do not need to be completely the same as the shooting times of all the material image candidates. For example, these blocks may analyze the camera moving speed, the moving direction, the zoom factor, and the subject distance at predetermined analysis times stored in advance in the ROM (Read Only Memory) 15 that are irrelevant to the frame rate of the images (typically at predetermined regular intervals between the start and the end of the shooting). In short, the shooting times can be replaced with the analysis times around the shooting times.

The CPU 10 instructs the panoramic image compositing range determination unit 6 to determine material images based on the result of the above analysis. In response to the instruction, the panoramic image compositing range determination unit 6 determines, as the material images, material image candidates shot during a camera movement in a certain direction as a result of the above analysis. The panoramic image compositing range determination unit 6 excludes, from the material images, material image candidates shot when the camera was held still or when a zoom operation was performed. As described above, the material images can be determined based on the difference in white balance or focal length between material image candidates.

When it is determined that panning was performed in S1, the CPU 10 controls the panoramic image compositing unit 8 to composite a panoramic image containing a continuous subject from the material images, in S2. If the continuity of the subject contained in the material images is broken due to a zoom factor change during the process of shooting, a plurality of panoramic images may be composited.

In S3, the CPU 10 controls the zoom speed detection unit 16 to detect the zoom speed of each of material image candidates shot at that time point when it is determined that the camera was not moving as a result of the analysis in S1.

In S4, the CPU 10 instructs the panoramic image compositing range determination unit 6 to determine the material images based on the result of the above zoom speed detection. In response to the instruction, the panoramic image compositing range determination unit 6 excludes, from the material images, material image candidates shot when the camera was being moved or shot with a zoom speed above a predetermined threshold. This is because an image shot with a zoom operation at a significantly high zoom speed during continuous shooting of material image candidates is also defective as a still image. The panoramic image compositing range determination unit 6 then determines, as a still image material, a material image candidate shot when the camera was held still and the zoom speed of the camera was below the predetermined threshold. The panoramic image compositing range determination unit 6 may also determine, as the still image material, a material image candidate shot when the camera was held still and the subject distance was below a predetermined threshold (that is, the subject was close to a certain extent).

In S4, the panoramic image compositing range determination unit 6 saves, as the still image material, the material image candidate determined as the still image material in S3 in the HDD 18.

In S5, the CPU 10 excludes material image candidates shot when it is determined that there was neither camera movement nor zoom from the material images in S1.

In S6, the CPU 10 associates the panoramic image composited in S2 with the still image material saved in S4 and saves them in the HDD 18.

In S7, the CPU 10 instructs the subject analysis unit 4 to analyze the subject types of the still image material and the panoramic image saved in S6. In response to the instruction, the subject analysis unit 4 analyzes the subject types of the still image material and the panoramic image. The CPU 10 determines whether or not the subject types of the still image material and the panoramic image are the same (for example, landscape) as a result of the analysis. If the subject types of the still image material and the panoramic image are the same, the process proceeds to S9. Otherwise, the process proceeds to S8. The CPU 10 instructs the layout determination unit 9 to determine the layout of the still image material and the panoramic image on the photo book according to the result of the above analysis of the subject types of the still image material and the panoramic image.

In S8, if the subject types of the still image material and the panoramic image are different, for example, if the subject type of the still image material is animal and the subject type of the panoramic image is landscape, the layout determination unit 9 determines the representative position in the point image as the position for placing the still image material.

In S9, if the point image is of the same subject type, the layout determination unit 9 determines, as the position for placing the still image material, a position near the representative position of the point image outside the area where the panoramic image exists (a position such that the distance to the representative position of the point image is within a predetermined threshold). If there are a plurality of still image materials shot with different zoom factors and corresponding to the same point image, the layout determination unit 9 can determine the layout of the still image materials according to the zoom factor for each still image material.

In S10, the CPU 10 instructs the photo book generation unit 19 to generate a photo book according to the layout determined by the layout determination unit 9 and the size determined by the size determination unit 17. The photo book generated by the photo book generation unit 19 can be printed, output on various recording media such as a CDR and a DVD, or sent to a network-connected device.

Thus, in this processing, portions subjected to a change in shooting conditions, such as zoom up, during the shooting of a moving image are excluded from materials for a panoramic image. This can prevent the occurrence of a part where shooting conditions are inconsistent in the panoramic image. Also, a portion subjected to a change in shooting conditions (specifically, zoom up, or zoom up with the camera held still) can be utilized as a still image material, and a layout can then be determined such that both of the panoramic image and the still image material can be seen without a feeling of strangeness.

While examples and embodiments of the present invention have been explained in detail, the present invention is not limited to the above, needless to say, various improvements and modifications may be added without departing from the scope of the present invention. For example, the present disclosed subject matter includes a recording medium on which a program controlling an information processing apparatus to execute the methods of determining an image layout according to any one of the embodiments. On the recording medium, the program may be non-transitorily recorded.

What is claimed is:

1. A method of determining an image layout to be performed by an information processing apparatus, the method comprising:

inputting material image candidates that are images including moving image frames and/or still images shot by an imaging device;

detecting a shooting condition of the imaging device at analysis times, the analysis times being shooting times of all or part of the material image candidates or times around the shooting times;

detecting a zoom factor of the imaging device at the time of shooting each material image candidate;

based on the shooting condition of the imaging device detected for respective analysis times, determining, among the material image candidates, composite image materials serving as materials for generating each composite image, and a still image material serving as a material for a still image associated with the composite image, one of the material image candidates being determined as the still image material at the time when the zoom factor is above a predetermined threshold;

generating the composite image based on the composite image materials; and determining an arrangement of the still image material and the composite image based on the shooting condition at the analysis time corresponding to the still image material, wherein the still image material is captured by a camera with a single visual field.

2. The method of determining an image layout according to claim 1, further comprising if a difference in the detected shooting condition of the imaging device between material image candidates at temporally adjacent analysis times is above a predetermined threshold, determining, as the still image material, a material image candidate corresponding to the analysis time at which the difference is above the predetermined threshold.

3. The method of determining an image layout according to claim 2, further comprising:

detecting a movement of the imaging device at each analysis time; and determining, as the still image material, a material image candidate corresponding to an analysis time at which the movement of the imaging device is below a predetermined threshold.

4. The method of determining an image layout according to claim 1, further comprising:

determining a size of each composite image based on a zoom factor for each composite image.

5. A method of determining an image layout to be performed by an information processing apparatus, the method comprising:

inputting material image candidates that are images including moving image frames and/or still images shot by an imaging device;

detecting a shooting condition of the imaging device at analysis times, the analysis times being shooting times of all or part of the material image candidates or times around the shooting times;

based on the shooting condition of the imaging device detected for respective analysis times, determining, among the material image candidates, composite image materials serving as materials for generating each composite image, and a still image material serving as a material for a still image associated with the composite image;

generating the composite image based on the composite image materials;

determining an arrangement of the still image material and the composite image based on the shooting condition at the analysis time corresponding to the still image material;

determining whether or not a type of a subject in the still image material and a type of a subject in the composite image are the same; and in response to determining that the types of the subjects in the still image material and the composite image are the same, determining an area outside the composite image as a position for placing the still image material.

6. A method of determining an image layout to be performed by an information processing apparatus, the method comprising:

inputting material image candidates that are images including moving image frames and/or still images shot by an imaging device;

detecting a shooting condition of the imaging device at analysis times, the analysis times being shooting times of all or part of the material image candidates or times around the shooting times;

based on the shooting condition of the imaging device detected for respective analysis times, determining, among the material image candidates, composite image materials serving as materials for generating each composite image, and a still image material serving as a material for a still image associated with the composite image;

generating the composite image based on the composite image materials;

determining an arrangement of the still image material and the composite image based on the shooting condition at the analysis time corresponding to the still image material;

specifying a point material that is a composite image material shot with a camera position matching a camera position at the time of shooting the still image material; and determining, as a position for placing the still image material, an area in the composite image around where the point material exists.

7. A method of determining an image layout to be performed by an information processing apparatus, comprising:

inputting material image candidates that are images including moving image frames and/or still images shot by an imaging device;

detecting a shooting condition of the imaging device at analysis times, the analysis times being shooting times of all or part of the material image candidates or times around the shooting times;

detecting a zoom factor at the time of shooting each of a plurality of still image materials;

based on the shooting condition of the imaging device detected for respective analysis times, determining, among the material image candidates, composite image materials serving as materials for generating each composite image, and a still image material serving as a material for a still image associated with the composite image;

generating the composite image based on the composite image materials;

determining an arrangement of the still image material and the composite image based on the shooting condition at the analysis time corresponding to the still image material; and determining predetermined positions as positions for placing the plurality of still image materials, the predetermined positions being such that a representative position in the point material of the composite image and a representative position in each of the plurality of still image materials correspond to the zoom factor at the time of shooting each of the plurality of still image materials, wherein the still image material is captured by a camera with a single visual field.

8. A method of determining an image layout to be performed by an information processing apparatus, the method comprising:

inputting material image candidates that are images including moving image frames and/or still images shot by an imaging device;

detecting a shooting condition of the imaging device at analysis times, the analysis times being shooting times of all or part of the material image candidates or times around the shooting times;

detecting a zoom speed of the imaging device at each analysis time;

based on the shooting condition of the imaging device detected for respective analysis times, determining, among the material image candidates, composite image materials serving as materials for generating each composite image, and a still image material serving as a material for a still image associated with the composite image;

generating the composite image based on the composite image materials;

determining an arrangement of the still image material and the composite image based on the shooting condition at the analysis time corresponding to the still image material; and based on the zoom speed detected for each analysis time, excluding, from still image materials, a material image shot at the time when the zoom speed is above a predetermined threshold among the material image candidates.

9. A non-transitory recording medium on which a program is recorded, the program comprising computer-executable instructions to execute a method, comprising:

inputting material image candidates that are images including moving image frames and/or still images shot by an imaging device;

detecting a shooting condition of the imaging device at analysis times, the analysis times being shooting times of all or part of the material image candidates or times around the shooting times;

detecting a zoom factor of the imaging device at the time of shooting each material image candidate;

based on the shooting condition of the imaging device detected for each analysis time, determining, among the material image candidates, composite image materials serving as materials for generating each composite image, and a still image material serving as a material for a still image associated with the composite image, one of the material image candidates being determined as the still image material at the time when the zoom factor is above a predetermined threshold;

generating the composite image based on the composite image materials; and determining an arrangement of the still image material and the composite image based on the shooting condition at the analysis time corresponding to the still image material, wherein the still image material is captured by a camera with a single visual field.

10. An information processing apparatus for determining an image layout, comprising:

an image input unit which inputs material image candidates that are images including moving image frames and/or still images shot by an imaging device;

a shooting condition detecting unit which detects a shooting condition of the imaging device at analysis times, the analysis times being shooting times of all or part of the material image candidates or times around the shooting times;

a zoom factor detecting unit detecting a zoom factor of the imaging device at the time of shooting each material image candidate;

a composite image material determining unit which determines, among the material image candidates, composite image materials serving as materials for generating each composite image, and a still image material serving as a material for a still image associated with the composite image, based on the shooting condition of the imaging device detected for each analysis time, one of the material image candidates being determined as the still image material at the time when the zoom factor is above a predetermined threshold;

a composite image generating unit which generates the composite image based on the composite image materials; and a layout determining unit which determines an arrangement of the still image material and the composite image based on the shooting condition at the analysis time corresponding to the still image material, wherein the still image material is captured by a camera with a single visual field.

* * * * *